(12) United States Patent
Rosen et al.

(10) Patent No.: US 10,953,333 B2
(45) Date of Patent: Mar. 23, 2021

(54) COMMUNITY-INTEGRATED SMART PLAYGROUND AND METHOD OF ITS USE

(71) Applicant: Biba Ventures, Inc., Vancouver (CA)

(72) Inventors: Michael David Rosen, Vancouver (CA); Byron Joshua Seef, Vancouver (CA); Matthew Herbert Toner, Vancouver (CA)

(73) Assignee: Biba Ventures, Inc., British Colombia (CA)

( * ) Notice: Subject to any disclaimer, the term of this patent is extended or adjusted under 35 U.S.C. 154(b) by 203 days.

(21) Appl. No.: 16/394,253

(22) Filed: Apr. 25, 2019

(65) Prior Publication Data

US 2020/0246706 A1    Aug. 6, 2020

Related U.S. Application Data

(60) Provisional application No. 62/662,625, filed on Apr. 25, 2018.

(51) Int. Cl.
| | | |
|---|---|---|
| A63F 13/65 | (2014.01) | |
| A63F 13/211 | (2014.01) | |
| A63F 13/216 | (2014.01) | |
| G06Q 30/02 | (2012.01) | |

(52) U.S. Cl.
CPC ............ *A63F 13/65* (2014.09); *A63F 13/211* (2014.09); *A63F 13/216* (2014.09); *G06Q 30/0209* (2013.01); *G06Q 30/0247* (2013.01); *A63F 2300/69* (2013.01)

(58) Field of Classification Search
None
See application file for complete search history.

(56) References Cited

U.S. PATENT DOCUMENTS

| | | | |
|---|---|---|---|
| 9,314,694 B2 | 4/2016 | Nadel et al. | |
| 2014/0349752 A1* | 11/2014 | Nadel | A63F 13/428 463/31 |
| 2017/0270765 A1* | 9/2017 | Roberts | H04M 1/72566 |
| 2018/0117417 A1* | 5/2018 | Davis | A63B 24/0087 |

* cited by examiner

*Primary Examiner* — James S. McClellan
*Assistant Examiner* — Peter J Iannuzzi
(74) *Attorney, Agent, or Firm* — GableGotwals

(57) ABSTRACT

Embodiments of a community-integrated smart playground of this disclosure and a method of its use include tracking geo-specific play data, populating a queue of digital notices, displaying one or more of the digital notices on a mobile device as a user plays on the playground and progresses through a virtual game dependent upon the playground activity, and producing revenue for the playground through the display or use of the digital notices. The playground includes at least one physical play structure containing a computer-readable identification tag, the at least one physical play structure representing a physical play activity. The virtual game may be non-analogous to the physical play but game progress is determined by the physical play. The system and method of its use may be executed by at least one mobile device having at least one microprocessor in network communication with the computer-readable identification tag and including associated software.

13 Claims, 5 Drawing Sheets

COMMUNITY-INTEGRATED SMART PLAYGROUND AND METHOD OF ITS USE

CROSS-REFERENCE TO PENDING APPLICATIONS

This application claims priority to U.S. Provisional Application No. 62/662,625 filed Apr. 25, 2018, the contents of which is incorporated by reference herein.

BACKGROUND

This disclosure is in the field of playgrounds and, more specifically, "smart playgrounds" that combine physical play activities with virtual play activities designed to work with one or more physical play structures of the playground to produce geo-specific play data.

A smart playground includes mobile games, apps or stories that are specifically designed to work with the equipment found in the playground. Examples of a smart playground may be found in U.S. Pat. No. 9,314,694 B2 to Nadel et al. and those using BIBA™ mobile games marketed by PlayPower, Inc. and Biba Ventures, Inc. While smart playgrounds provide many advantages over traditional playgrounds, neither type of playground has been connected to its surrounding community in a way that enables the playground to generate revenue for the playground through use of the playground.

SUMMARY

Embodiments of a community-integrated smart playground of this disclosure and a method of its use include tracking geo-specific play data, populating based on location a queue of digital notices, displaying one or more of the digital notices on a mobile device as a user plays on the playground and progresses through a virtual game dependent upon the playground activity, and producing revenue for the playground through the display or use of the digital notices. The playground includes at least one physical play structure containing a computer-readable identification tag, the at least one physical play structure representing a physical play activity. The virtual game may be non-analogous to the physical play but game progress is determined by the physical play. The system and method of its use may be executed by at least one mobile device having at least one microprocessor in network communication with the computer-readable identification tag and including associated software.

The system and method may comprise the following: receiving a computer-readable signal from the computer-readable identification tag; determining based upon the received computer-readable signal a global position location of the at least one physical play structure; defining the global position location as a center point of a predetermined radius; identifying a respective location of one or more predetermined third parties relative to the predetermined radius; populating a digital notice queue containing one or more digital notices associated with the one or more third parties; tracking a motion of a user on the at least one physical play structure; translating the motion of the user to progress within a virtual play system, the virtual play system representing a play activity different than or the same as that of the physical play activity; displaying a digital notice of the digital notice queue when the user progresses to a predetermined milestone in the virtual play activity; performing an analysis of data collected during the physical play activity, the data collected being associated with at least one predetermined metric; tracking a result of the digital notice displayed.

The at least one predetermined metric may be a user metric; a caregiver metric; a social media metric; a playground traffic metric; an equipment use metric; a chronological metric; a weather metric; an event metric; a demographic metric; and a third-party metric. The digital notice may be displayed on a mobile device of the user, a caregiver of the user, or both. In other embodiments, the digital notice displayed on a mobile device of the user is a different digital notice than one displayed on a mobile device of a caregiver of the user. The digital notice may contain information pertaining to a business entity or an event located within the predetermined radius. In some embodiments, the digital notice contains information pertaining to a business entity or an event located outside of the predetermined radius. A second digital notice may be displayed on a mobile device of the user, a caregiver of the user, or both.

Populating the digital queue may include prioritizing an order of digital notices based upon at least one metric associated with the user or a caregiver of the user. In other embodiments, populating the digital queue includes prioritizing an order of digital notices based upon a ranking of the one or more third parties.

User-centric data may be stored in a database, the database being in network communication with the at least one microprocessor, at least a portion of the user-centric data being based on the motion of the user. Caregiver-centric data may also be stored in the database. The method may continue to track the motion of the user when engaged in a physical play activity outside of the playground.

In embodiments of a system of this disclosure for generating revenue for a playground based on use of the playground, the system includes at least one physical play structure containing a computer-readable identification tag, the at least one physical play structure representing a physical play activity; a first and a second mobile device in network communication with the computer-readable identification tag, each mobile device including at least one microprocessor and associated software; wherein the at least one microprocessor and associated software of the first and second mobile devices is configured to:

determine a global position location of the at least one physical play structure;

define the global position location as a center point of a predetermined radius;

identify a respective location of one or more predetermined third parties relative to the predetermined radius;

populate a digital notice queue containing one or more digital notices associated with the one or more third parties;

display a digital notice of the digital notice queue on the first mobile device, the second mobile device, or both the first and second mobile device when a user of the first mobile device progresses to a predetermined milestone in the physical play activity; and wherein the microprocessor and associated software of at
least the first mobile device is configured to:
track a motion of the user on the at least one physical play structure;

translate the motion of the user to progress within a virtual play system, the virtual play system representing a play activity different than that of the physical play activity; and transmit data associated with the motion to a database in network communication with first mobile device; and wherein the system further includes at least one other
microprocessor and associated software in network communication with the database and configured to perform an analysis of data collected during the physical play activity, the data collected being associated with at least one predetermined metric; track a use of the digital notice displayed on at least the second mobile device; and display analytics of the data collected on the physical play activity and the use of the digital notice. The system may also allocate payment based on the display, the use, or both the display and the use.

DETAILED DESCRIPTION

Figure 1:
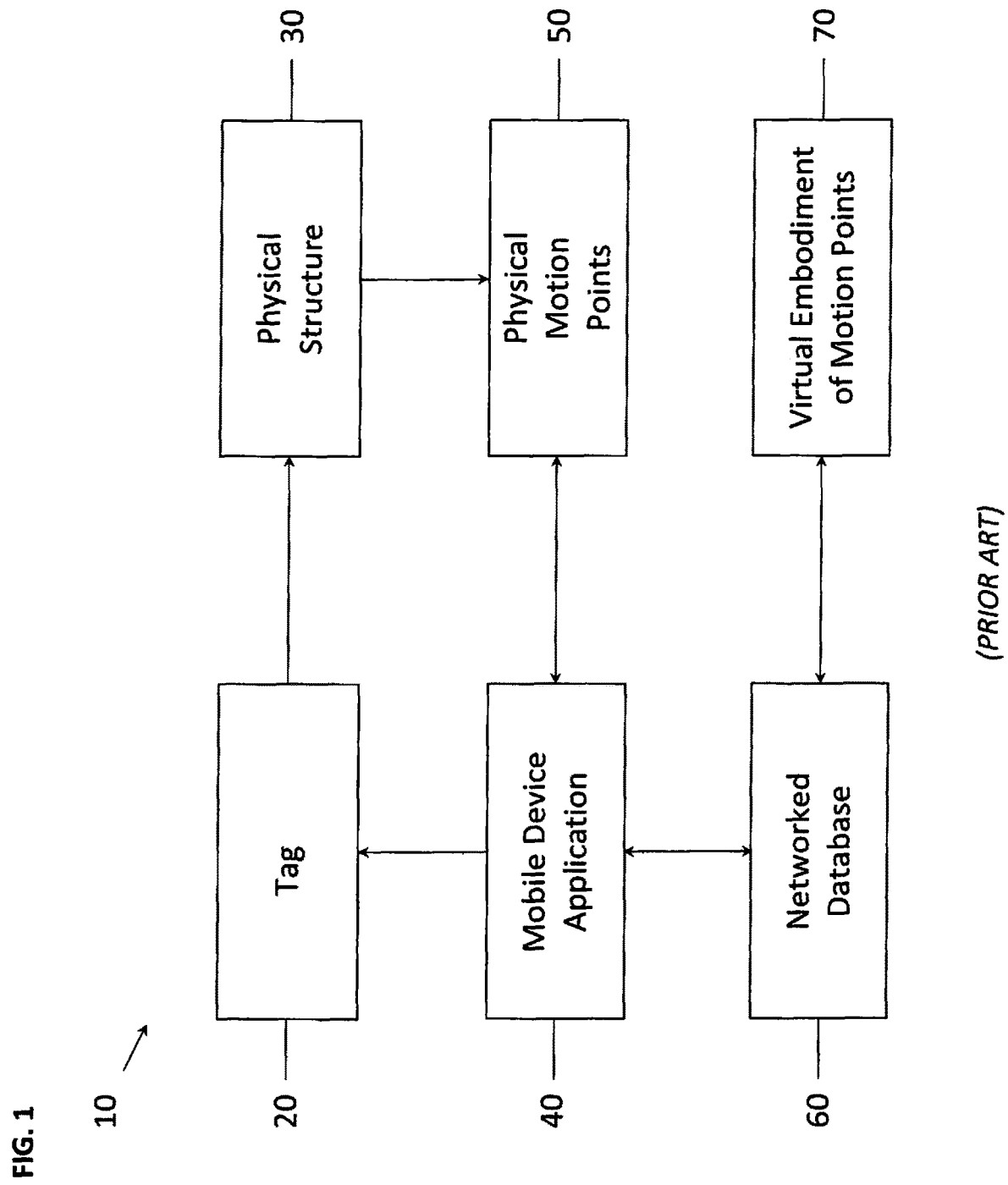
FIG. 1 is a schematic of a prior art smart playground.
Figure 2:
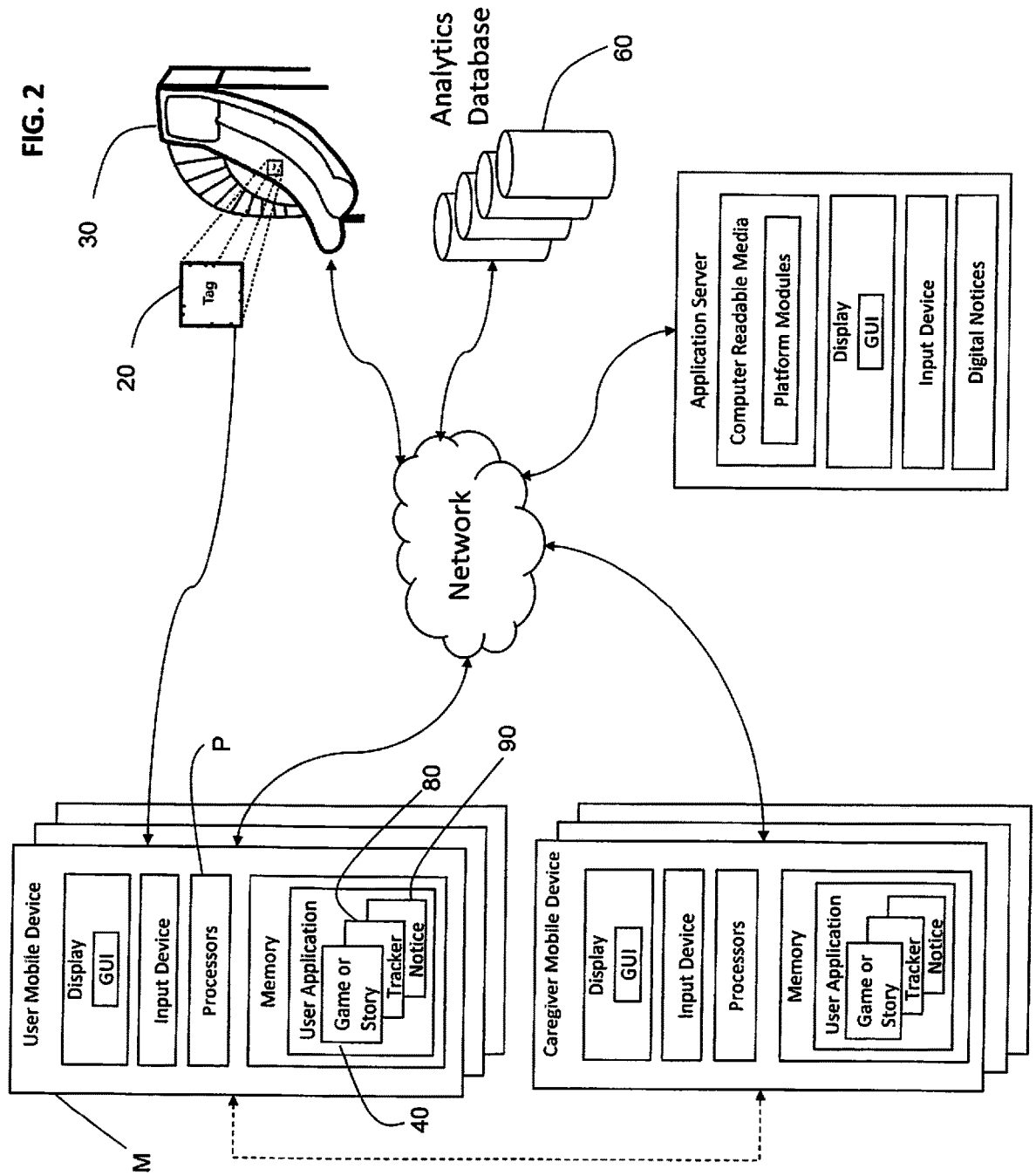
FIG. 2 is an embodiment of a system and method of this disclosure. Although two mobile devices are shown, a user and a caregiver mobile device, a single mobile device may be used.
Figure 3:
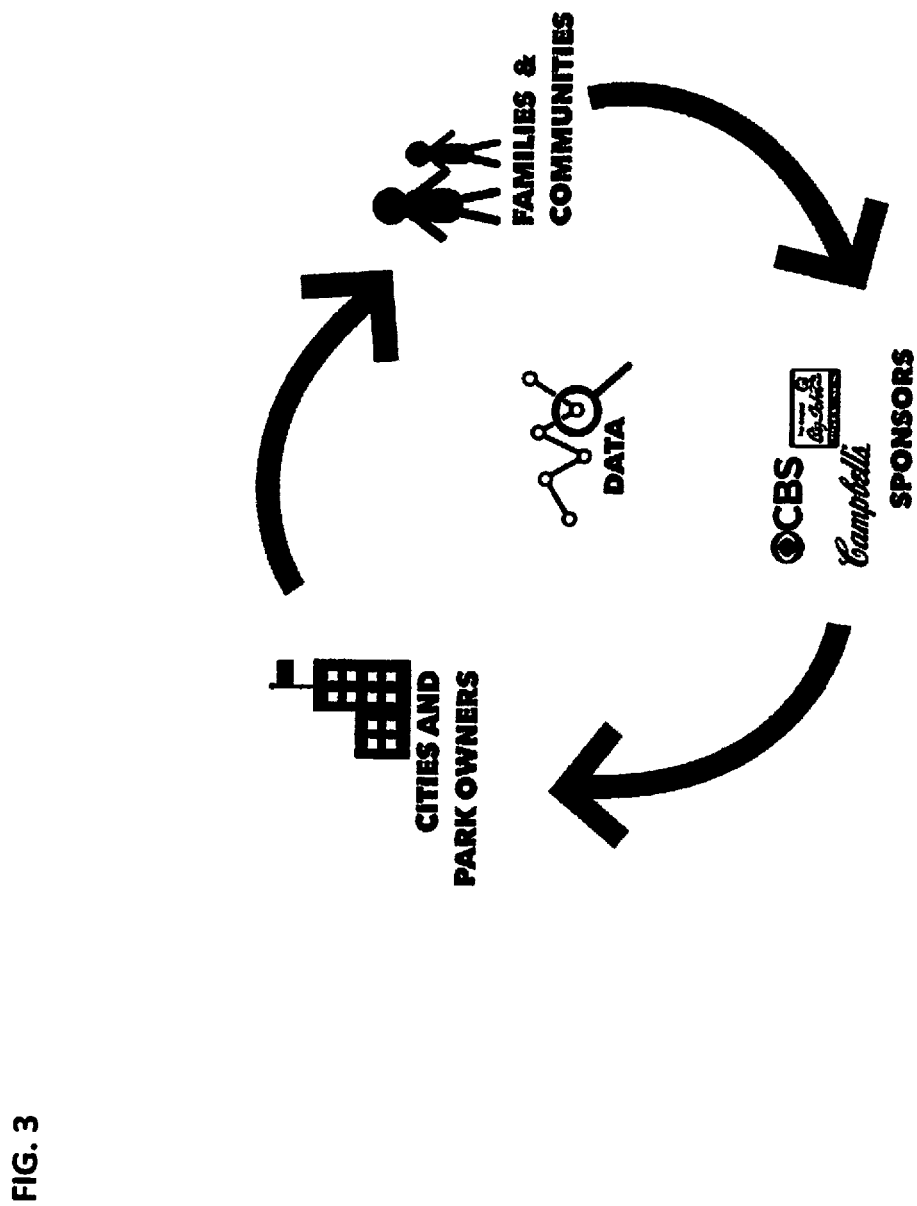
FIG. 3 is a flow chart illustrating an economic cycle created by use of embodiments of this disclosure.
Figure 4:
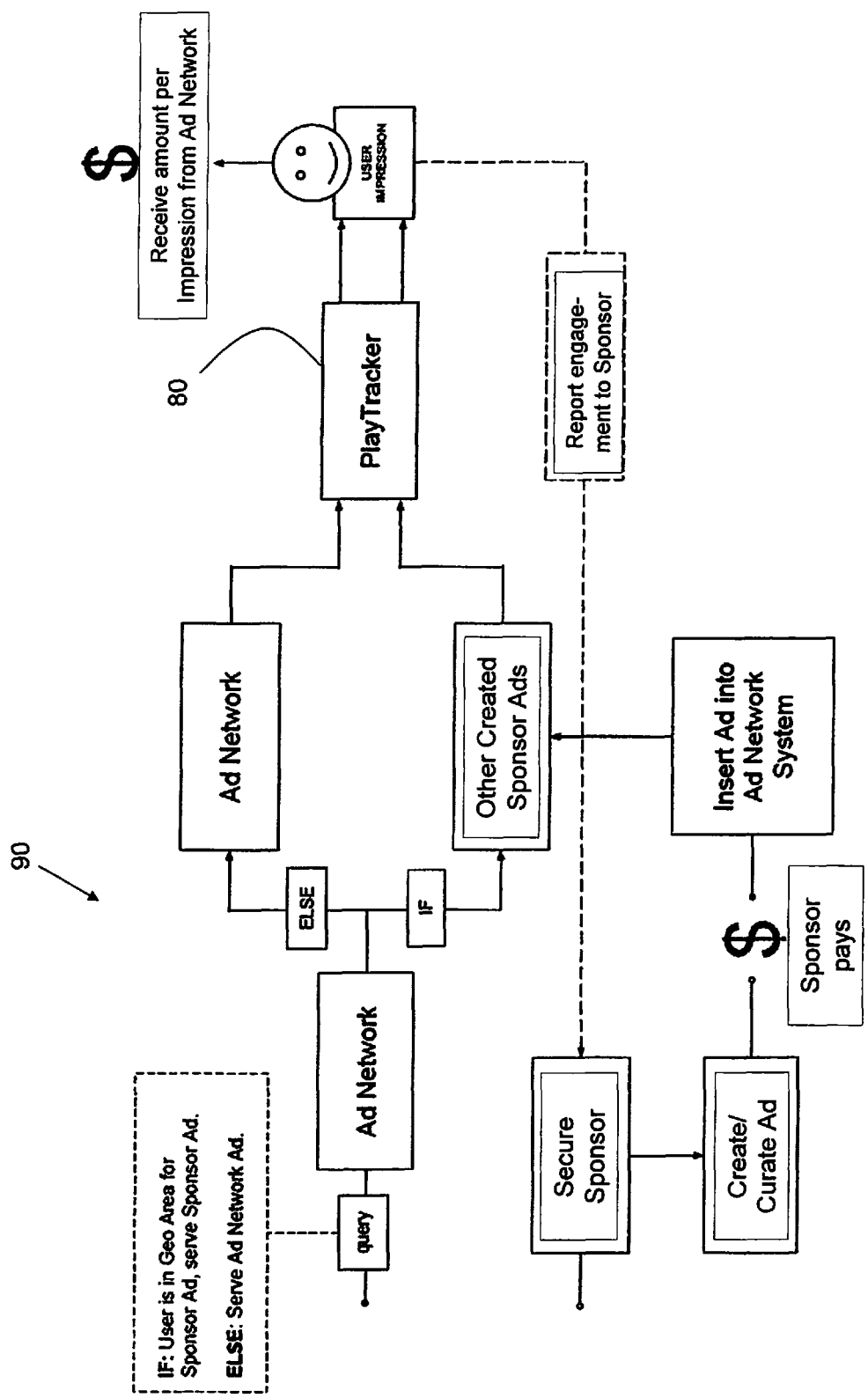
FIG. 4 is flow chart of embodiments of a digital notice system and method of this disclosure.
Figure 5:
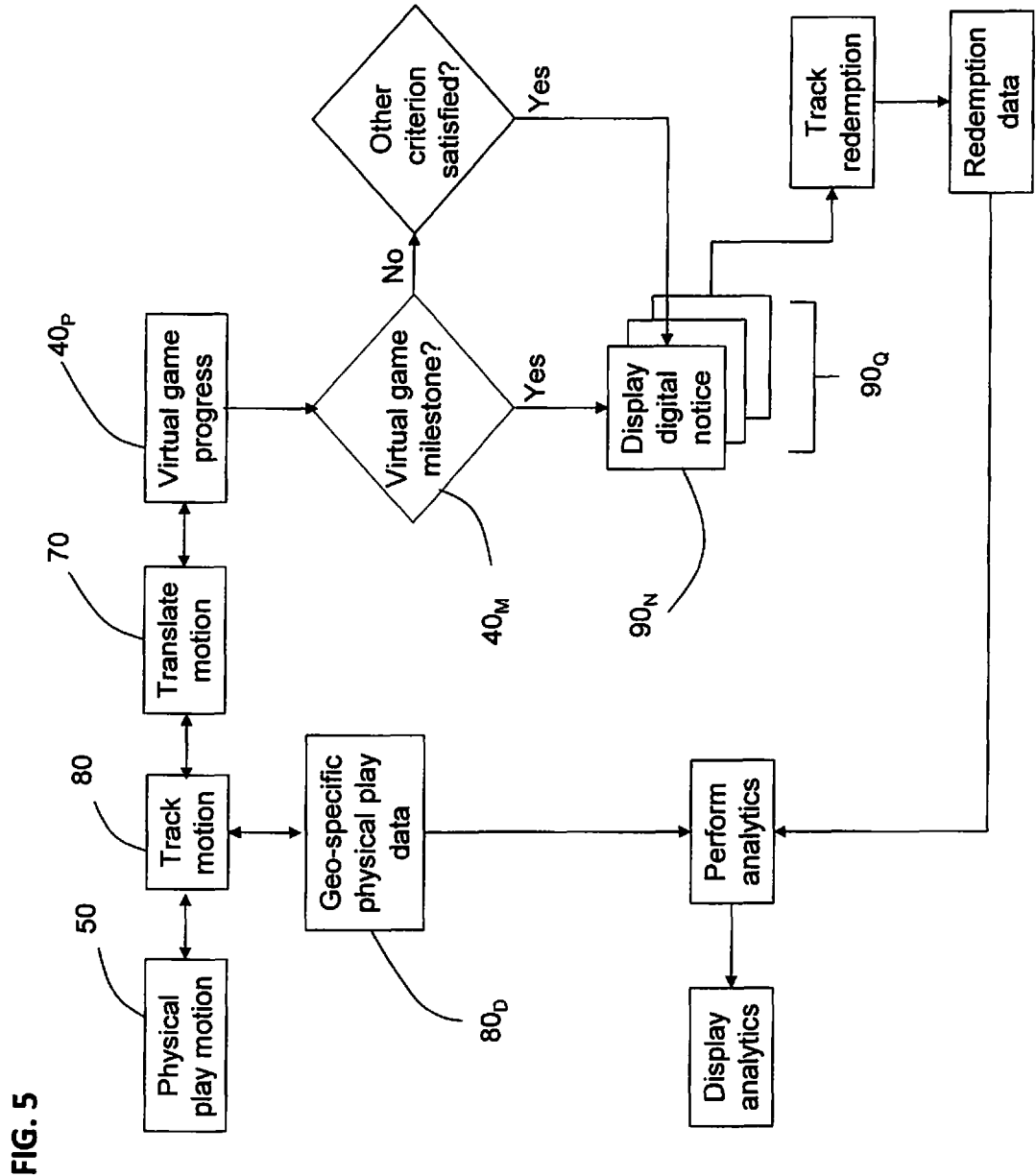
FIG. 5 is a flow chart of illustrating an embodiment of data tracking and display.

Referring to the drawings, in embodiments of this disclosure a smart playground 10 includes at least one physical play structure 30 containing a computer-readable identification tag 20 and a virtual game, app or story 40 running on a mobile device designed to work with the at least one physical play structure 30. The mobile device application 40 is in network communication with a database 60. An example of this type of playground is disclosed in U.S. Pat. No. 9,314,694 B2 to Nadel et al., the contents of which is incorporated by reference herein. Other examples include playgrounds using BIBA™ mobile games marketed by PlayPower, Inc. and Biba Ventures, Inc. As a user plays on or interacts with the physical play structure 30 physical motion points 50 are obtained and translated into a virtual embodiment of motion points 70. However, unlike other play experiences, the virtual motion points 70 are not identical to those of the physical motion points 50 because the physical play being experienced on the play structure 30 is not the same as the virtual play being executed by the mobile device application 40. The play of the mobile device application 40 is not intended to replicate the same play but rather motivate the user to play on or continue to play on the play structure 30. Physical play translates to user progress through the virtual game, app, or story.

In embodiments of a system and method of this disclosure, a play tracker 80 tracks physical motion points 50 and virtual game progress $40_P$ when a predetermined milestone $40_M$ is accomplished in the virtual game 40, a digital notice $90_N$ may be sent to the user or the user's care giver. Other criterion, such as but not limited to physical presence on the playground or demographic data of the user or caregiver, may be used to issue the digital notice $90_N$. The notice $90_N$ may include a benefit or reward offered by third party located within a predetermined radius of the playground or play structure 30. Redemption of the benefit or reward may be tracked. Some portion of the revenue connected with displaying the notice $90_N$ or redeeming the benefit may be allocated to the playground or between a curator of the notice $90_N$ and the playground. In this way, the playground provides its own revenue stream for maintenance and improvements. The geo-specific play data $80_D$ collected may also be provided to playground owners and operators for use in managing the playground and its utilization.

In embodiments, the physical play structure 30 may be a piece of playground equipment such as balancing equipment, climbing equipment, jumping equipment, riding equipment, sliding equipment, spinning equipment, or swinging equipment. The identification tag 20 may be a quick response code, an augmented reality card, a radio-frequency identification tag, or a near field identification tag. Movement of a user on the physical play structure 30 may be detected using an accelerometer or a global positioning system and may be translated into movement or progress within the virtual game or story 40. The virtual game, app or story 40 may be a mobile software app, with the user's mobile device M being used to track physical movement. The virtual game or story 40 represents a play activity different than the one being played on the play structure 30.

As user movement is tracked, detailed geo-specific play data $80_D$ may be collected and transformed into reports and insights that can help playground owners and operators make better choices and smarter funding decisions. Embodiments of this disclosure may be configured to collect data ranging from peak play hours to factors such as but not limited to weather and user demographics. Other data may include caregiver demographics, play pattern data relative to equipment, and chronological data.

By way of a non-limiting example, as a child plays on the physical play structures of the playground, the child may earn rewards in the virtual game or story associated with those structures. The rewards may be an achievement badge, a new character, a new level, or some combination thereof. The child's caretaker, in turn, may receive benefits or rewards such as coupons or discounts at local businesses, all done seamlessly as part of the gameplay experience. These coupons or discounts may be displayed on the caretaker's mobile device as a digital notice. In some embodiments, even while away from the playground, the caretaker may receive benefits or rewards for the child's overall physical activity level through a play tracker app that keeps track of play frequency over time and on a geo-locative basis.

The notice $90_N$ being displayed may be from a third party whose business is located within a predetermined radius of the playground or may be connected to third party whose physical location lies outside of the radius or to an event that is not geographically constrained. A predetermined portion of the revenue from advertising, redemption of the coupon, or some combination thereof goes to the playground owner. In some embodiments, a portion of the revenue may go to a charitable cause supported by the playground owner or a charitable event or fund raiser the playground owner, caregiver, or child has chosen to participate in.

In embodiments of this disclosure, the system and method may display a variety of different style of notices $90_N$, including but not limited to interstitials (full-screen ads that cover the interface of their host app), pre/post roll (promotional video message that plays before the content the user has selected), lower thirds (graphic overlay placed in the title-safe lower area of the screen), or coupons/rewards (to be redeemed for a discount or rebate when purchasing a product). Detailed backend analytics and geo-locative capabilities may be used to conduct split tests amount predetermined user segments and cohort groups to ensure the notices $90_N$ being displayed are the correct ones for that segment or group (e.g., likely to match user needs or wants or yield the best return on investment for third party advertisers and sponsors). The game or story 40 may be a white label game that is branded with a third-party advertiser or sponsor.

In embodiments of a system and method of tracking geo-specific play data $80_D$ and producing revenue for a smart playground, at least one microprocessor P in network communication with the computer-readable identification tag 20 and including associated software receives a computer-readable signal from the computer-readable identification tag 20 of the physical play structure 30 and determines, based upon the received computer-readable signal, a global position location of the at least one physical play structure 30. Other data relating to the user may also be retrieved including, but not limited to, personal identifying information including historical physical activity and virtual game- or story-related information. Data may also be retrieved about the user's caregiver.

The global position location may be defined as a center point of a predetermined radius. A digital notice queue $90_Q$ may then be populated containing one or more digital notices $90_N$ associated with one or more third parties having physical business locations or events located within the predetermined radius or outside of the predetermined radius. As the motion of the user is tracked on the physical play structure 30 or on a combination of two or more physical play structures 30 on the playground, the user's motion is translated into progress $40_P$ within the virtual play system 40. When the user progresses to a predetermined milestone $40_M$ in the virtual play system 40, the user may receive notice $90_N$ of a play-centric reward and the user's caregiver may receive one of the digital notices $90_N$ associated with a third party. In some embodiments, the user's physical activity may be tracked while away from the playground, with digital notices $90_N$ being displayed to the caregiver when physical activity achieves certain milestones. The user may also receive notice of a play-centric reward or a third-party notice. Where the notice $90_N$ is in the form of a coupon or discount, its redemption may be tracked.

While embodiments of a system and method of a community-integrated smart playground of this disclosure and a method of its use have been described, modifications may be made to the system and method without departing from the scope of the following claims. The claims include the full range of equivalents to which each element is entitled.

The invention claimed is:

1. A method of tracking geo-specific play data and producing revenue by means of play on a playground, the playground including at least one physical play structure containing a computer-readable identification tag, the at least one physical play structure representing a physical play activity, the method being executed by at least one microprocessor in network communication with the computer-readable identification tag and including associated software, the method comprising:
  receiving a computer-readable signal from the computer-readable identification tag;
  determining based upon the received computer-readable signal a global position location of the at least one physical play structure;
  defining the global position location as a center point of a predetermined radius;
  identifying a respective location of one or more predetermined third parties relative to the predetermined radius;
  populating a digital notice queue containing one or more digital notices associated with the one or more third parties;
  tracking a motion of a user on the at least one physical play structure;
  translating the motion of the user to progress within a virtual play system, the virtual play system representing a play activity different than that of the physical play activity;
  displaying a digital notice of the digital notice queue when the user progresses to a predetermined milestone in the physical play activity;
  performing an analysis of data collected during the physical play activity, the data collected being associated with at least one predetermined metric;
  tracking a result of the digital notice displayed.

2. A method according to claim 1, wherein the digital notice is displayed on a mobile device of the user, a caregiver of the user, or both.

3. A method according to claim 1, wherein a digital notice displayed on a mobile device of the user is a different digital notice than one displayed on a mobile device of a caregiver of the user.

4. A method according to claim 1, wherein the digital notice contains information pertaining to a business entity or an event located within the predetermined radius.

5. A method according to claim 1, wherein the digital notice contains information pertaining to a business entity or an event located outside of the predetermined radius.

6. A method according to claim 1, wherein the populating the digital queue includes prioritizing an order of digital notices based upon at least one metric associated with the user or a caregiver of the user.

7. A method according to claim 1, wherein the populating the digital queue includes prioritizing an order of digital notices based upon a ranking of the one or more third parties.

8. A method according to claim 1, further comprising continuing to track a motion of the user when engaged in a physical play activity outside of the playground.

9. A method according to claim 8, wherein a second digital notice is displayed on a mobile device of the user, a caregiver of the user, or both.

10. A method according to claim 1, further comprising storing user-centric data in a database, the database being in network communication with the at least one microprocessor, at least a portion of the user-centric data being based on the motion of the user.

11. A method according to claim 10, further comprising storing caregiver-centric data in the database.

12. A method according to claim 1, wherein the at least one predetermined metric is selected from the group consisting of a user metric; a caregiver metric; a social media metric; a playground traffic metric; an equipment use metric; a chronological metric; a weather metric; an event metric; a demographic metric; and a third party metric.

13. A system for generating revenue for a playground based on use of the playground, the system comprising:
  at least one physical play structure containing a computer-readable identification tag, the at least one physical play structure representing a physical play activity;
  a first and a second mobile device in network communication with the computer-readable identification tag, each mobile device including at least one microprocessor and associated software;
  wherein the at least one microprocessor and associated software of the first and second mobile devices is configured to p1 determine a global position location of the at least one physical play structure;
  define the global position location as a center point of a predetermined radius;
  identify a respective location of one or more predetermined third parties relative to the predetermined radius;

populate a digital notice queue containing one or more digital notices associated with the one or more third parties;

display a digital notice of the digital notice queue on the first mobile device, the second mobile device, or both the first and second mobile device when a user of the first mobile device progresses to a predetermined milestone in the physical play activity;

wherein the microprocessor and associated software of at least the first mobile device is configured to track a motion of the user on the at least one physical play structure;

translate the motion of the user to progress within a virtual play system, the virtual play system representing a play activity different than that of the physical play activity; and transmit data associated with the motion to a database in network communication with first mobile device; and at least one other microprocessor and associated software in network communication with the database and configured to perform an analysis of data collected during the physical play activity, the data collected being associated with at least one predetermined metric;

track a use of the digital notice displayed on at least the second mobile device; and display analytics of the data collected during the physical play activity and the use of the digital notice.

* * * * *